United States Patent Office 3,657,437
Patented Apr. 18, 1972

1

3,657,437
AGENTS INHIBITING FUNGUS GROWTH
AND METHOD OF CONTROLLING FUNGI
THEREWITH
Jorg Bader, Arlesheim, and Karl Gatzi, Basel, Switzerland, assignors to Geigy Chemical Corporation, Ardsley, N.Y.
No Drawing. Division of application Ser. No. 706,614, Feb. 19, 1968, now Patent No. 3,527,867, which is a continuation-in-part of application Ser. No. 621,800, Mar. 9, 1967, which in turn is a continuation-in-part of application Ser. No. 555,994, June 8, 1966. This application Apr. 13, 1970, Ser. No. 34,919
Claims priority, application Switzerland, June 11, 1965, 8,200/65; Feb. 23, 1967, 2,700/67
Int. Cl. A01n 9/12, 9/22; C07d 71/00
U.S. Cl. 424—248    4 Claims

ABSTRACT OF THE DISCLOSURE

Agents for inhibiting the growth of fungi, which contain as active component 5-amino-1,2-dithiol-3-ones substituted at the amino group and also in 4-position, and method of controlling phytopathogenic and other noxious fungi with such agents, which are of surprisingly low phytotoxicity.

RELATED APPLICATIONS

This application is a division of our co-pending application Ser. No. 706,614, filed Feb. 19, 1968, now U.S. Patent No. 3,527,867. Application Ser. No. 706,614 was a continuation-in-part of our patent application Ser. No. 621,800, filed Mar. 9, 1967, which in turn was a continuation-in-part of our application Ser. No. 555,994, filed June 8, 1966, both now abandoned.

DETAILED DISCLOSURE

The present invention concerns new fungicidal agents which contain 1,2-dithiol-3-ones the 5-position of which is occupied by a substituted amino group, as active ingredients, as well as methods for controlling the growth of injurious fungi on plants and organic materials and for the protection of organic materials and objects from attack by injurious and destructive fungi by applying to such materials or objects the aforesaid 1,2-dithiol-3-ones or agents containing them. It also concerns the materials and objects so protected.

Certain representatives from the class of 1,2-dithiol-3-ones, namely 1,2-dithiol-3-ones chlorinated in the 5-position such as 4,5-dichloro-1,2-dithiol-3-one (German patent application No. 1,102,174) and 4-aryl-5-chloro-1,2-dithiol-3-ones (German patent application No. 1,126,668) have been described in the literature as pesticidally or fungicidally active substances.

However, these compounds are either, for practical purposes, of insufficient activity against phytopathogenic fungi and/or their spores, or they are unsuited for use in the control of phytopathogenic fungi due to their excessively high phytotoxicity. The antifungally active known compounds are especially phytotoxic, for instance, against such typical plants liable to suffer from fungal infestation, beans, cucumbers, and the like.

In contrast thereto, the invention provides antifungal agents which contain, as active ingredients, 5-amino-1,2-dithiol-3-ones of the formula

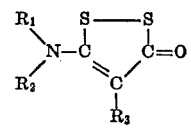

(I)

wherein $R_1$ represents hydrogen, an alkanoyl or a benzoyl radical or an aliphatic hydrocarbon radical substituted by functional groups, especially alkyl, hydroxy-alkyl, lower alkoxy-alkyl, cyano-alkyl or phenyl-alkyl radicals, $R_2$ represents an aliphatic hydrocarbon radical as defined under $R_1$ or an unsubstituted or substituted phenyl or naphthyl radical, or $R_1$ and $R_2$ together with the nitrogen atom to which they are linked represent a 5- to 7-membered heterocyclic radical, optionally substituted by lower alkyl, more particularly a pyrrolidino, piperidino, hexamethyleneimino, morpholino, piperazino, N-lower alkyl-piperazino, N-nitroso-piperazino, N-lower alkanoyl-piperazino, N-lower alkoxycarbonyl-piperazino, N-benzyl-piperazino or N-benzoyl-piperazino, and $R_3$ represents halogen, a lower alkyl radical or a phenyl radical optionally substituted by lower alkyl, but preferably $R_3$ represents chlorine, and which are excellently suitable for combatting in particular phytopathogenic fungi, but also fungi which injure and destroy organic materials other than plants, and objects made of such materials as well as for the protection of such materials and objects from attack by such fungi. The agents according to the invention are very well tolerated by the amove-mentioned plants.

Particularly useful on account of their activity against phytopathogenic fungi are those compounds of Formula I in which $R_3$ represents chlorine or bromine, and preferably the former.

"Lower" used with an aliphatic radical or moiety in this specification and in the appended claims means that such radical or moiety has from 1 to 4 carbon atoms.

Aliphatic hydrocarbon radicals symbolized by $R_1$ and $R_2$ in Formula I, are in particular lower alkyl radicals, having 1 to 4 carbon atoms, which radicals are unsubstituted or can be substituted by functional groups such as preferably hydroxy or lower alkoxy, but also by amino, carboxy, carbamoyl, alkylthio, alkylamino, dialkylamino, alkoxycarbonyl or N-alkyl- and N,N-dialkyl-carbamoyl groups. One of the radicals $R_1$ or $R_2$ can also represent a lower alkyl, especially a methyl or ethyl radical substituted by the phenyl radical, or it can be a benzoyl radical; the benzene nucleus of such phenyl or benzoyl radical can in turn be substituted, especially by alkyl, alkoxy, halogenoalkyl or halogen.

"Alkyl" in the definitions of substituents, especially those represented by $R_1$, $R_2$ and $R_3$ represents preferably "lower alkyl", unless expressly stated otherwise.

In the case of $R_2$ being a substituted phenyl or naphthyl radical, ionogenic substituents can be hydroxy, amino, mercapto, carboxyl, sulfo, sulfoamino (e.g. $HSO_3$—NH—) groups; furthermore non-ionogenic groups such as halogen atoms, especially chlorine, bromine or fluorine, carbamoyl, sulfamoyl, mono- or di-substituted, and preferably mono- or di-alkyl substituted carbamoyl or sulfamoyl groups; alkoxy-carbonyl-amino, cyano, nitro or acyl groups, the latter being preferably lower alkanoyl groups; furthermore hydrocarbon radicals, especially alkyl, alkenyl, aryl or aralkyl radicals, and such radicals linked to the aromatic nucleus, of the phenyl or naphthyl radical, via an oxygen or sulfur or nitrogen atom, in the latter case especially via an imino, preferably an unsubstituted or an alkyl-substituted imino bridge, or via a sulfinyl or sulfonyl bridge; the last mentioned hydrocarbon radical can in turn be substituted by one or several substituents selected from halogen and the other above-mentioned ionogenic and non-ionogenic substituents.

These groups do not impair the fungitoxic activity of the compounds of Formula I and do not impart to these compounds a degree of phytotoxicity damaging to cultivated plants to be protected by these compounds.

The heterocyclic radicals represented by $R_1$ and $R_2$ when taken together with the nitrogen atom to which they are linked can be mono- or poly-substituted, e.g., by an alkyl, alkoxy, alkoxycarbonyl, N-alkyl- and N,N-dialkylcarbamoyl, aminoalkyl or carbamoyl group. "Alkyl" in all these groups is preferably "lower alkyl."

Optimal antifungal activity is shown by those compounds falling under Formula I in which $R_1$ and $R_2$ are lower alkyl, or in which $R_1$ and $R_2$ together with the nitrogen atom form a heterocyclic ring, e.g. piperidino, methyl piperidino, morpholino, or hexamethyleneimino; or those compounds in which $R_1$ represents hydrogen or lower alkyl, $R_2$ represents a phenyl radical any substituent of which is selected from hydroxy, a grouping

carboxyl, sulfo, a grouping

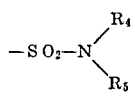

a grouping

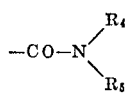

lower alkoxy-carbonyl, lower alkanoyl, cyano, nitro, trifluoromethyl, lower alkyl, lower alkoxy, lower alkylthio, lower alkyl-sulfinyl, benzyl and phenyl; each of $R_4$ and $R_5$ represents independently hydrogen or lower alkyl; and $R_3$ represents bromine or chlorine, but especially the latter.

The compounds of Formula I contained in the new agents as active substances are active against numerous phytopathogenic fungi. The agents serve to protect plants or parts thereof such as blossom, seeds, fruit, roots, stems and foliage from attack by fungi and to combat fungi on these parts of plants.

The 5-amino-1,2-dithiol-3-ones of Formula I are not phytotoxic and are very well tolerated by the plants. In addition, the active substances have a systemic action, for which reason the plants treated with the agents according to the present invention are given wider and more protracted protection from attack by fungi. The agents are also suitable for the treatment of seeds without germination being affected. In plant protection, the new agents are so applied that the concentration of active ingredient usually lies between 0.01 and 2% by weight calculated on the total weight of the agent.

They are also active against fungi of the soil, especially those pertaining to the cotton seedling disease complex, e.g. Pythium, Fusarium and Rhizoctonia fungi.

The 5-amino-1,2-dithiol-3-ones of Formula I have good to very good fungistatic activity against fungi such as *Aspergillus niger* ATCC, *Penicillium exp.*, *Fusarium oxysporium, Candida albicans*, etc., which injure and destroy organic materials such as wood, leather, synthetic plastics, fabrics, coating agents, etc. They also show bacteriostatic activity.

The marginal concentration inhibiting the growth of these fungus strains is at about 3 to 30 p.p.m. of active substance. On impregnation with solutions or dispersing of active substance containing at least 1 g. of active substance per liter, the materials treated are given effective and long-lasting protection.

The compounds of Formula I are produced by reacting a 5-chloro-1,2-dithiol-3-one which is substituted in 4-position by a substituent as defined under $R_3$ in Formula I with an amine of the formula $HNR_1R_2$, wherein $R_1$ and $R_2$ have the same meanings as in Formula I, and, if the basicity of the amine is too low, in the presence of an acid-binding agent, e.g. a tertiary amine such as a trialkylamine or dialkylaniline; compounds falling under Formula I in which $R_2$ is not hydrogen can be obtained by introducing into the corresponding 5-anilino- or 5-naphthylamino-1,2-dithiol-3-one which is substituted in 4-position by $R_3$ as defined in Formula I, an aliphatic hydrocarbon radical or an alkanoyl or benzoyl radical, e.g. by reaction with a correspondingly constituted alkylating or acylating agent, respectively. If $R_2$ contains a second reactive group, e.g. a secondary amine group, this may be protected as usual, e.g. by the nitro group, and the protecting group may be split off thereafter.

The invention is further illustrated by the following non-limitative examples. Parts and percentages given therein are by weight unless expressly stated otherwise. Temperatures are in degrees centigrade.

EXAMPLE 1

To a suspension of 5 parts of 4,5-dichloro-1,2-dithiol-3-one in 5 parts of ethylene glycol monomethyl ether, 12 ml. of an aqueous 30% solution of dimethylamine are added in portions in the course of 5 minutes. After each addition, the mixture is well shaken, and the reaction flask is cooled with running water. After completion of the addition, the mixture is stirred at 30° for 15 minutes and then at 0° for another 30 minutes. The crystalline reaction product is filtered off, washed with water, and recrystallized from methanol. Thus are obtained 2.5 parts (48% of the theoretical amount) of 4-chloro-5-dimethylamino-1,2-dithiol-3-one in white crystals of melting point 100°.

EXAMPLE 2

187 parts of 4,5-dichloro-1,2-dithiol-3-one are suspended in 400 parts of ethanol. To this suspension, a mixture of 160 parts of pyrrolidine and 150 parts of ethanol is added within 10 minutes with stirring. During the addition the temperature is held at 20–25° by external cooling. Stirring is then continued at room temperature (20°) for about 6 hours. Then the crystals are filtered off, washed with cold ethanol and water, and recrystallized from 2000 parts of ethanol. There are obtained 120 parts (54% of the theoretical amount) of 4-chloro-5-pyrrolidino-1,2-dithiol-3-one. The melting point is 142–144°.

EXAMPLE 3

187 parts of 4,5-dichloro-1,2-dithiol-3-one are dissolved in 1000 parts of ether, and 370 parts of n-dodecylamine are added, with stirring, in small portions (about 20 parts at a time) over a period of ca. 30 minutes without cooling. An exothermic reaction is observed, and the mixture becomes red. After completion of the addition, stirring is continued for another 60 minutes. The mixture is filtered and the filtrate evaporated. The remaining oil is treated with 1000 parts of petrol ether (B.P. 30–50°) whereupon the 4-chloro-5-n-dodecylamino-1,2-dithiol-3-one separates in crystals. It is filtered off and recrystallized from diisobutylene (a mixture of 2,4,4-trimethyl-1-pentene and 2,4,4-trimethyl-2-pentene). The purified product melts at 62°.

By repeating the above examples but using in lieu of n-dodecylamine an equivalent amount of the corresponding amines, there are obtained 4-chloro-5-benzylamino-1,2-dithiol-3-one, M.P. 141°
4-chloro-5-methylamino-1,2-dithiol-3-one, M.P. 168°.

EXAMPLE 4

187 parts of 4,5-dichloro-1,2-dithiol-3-one are suspended in 800 parts of methanol, and 230 parts of mononitroso-piperazine (prepared according to U.S. Pat. No. 2,907,767) are added thereto with stirring in the course of 15 minutes. The 4,5-dichloro-1,2-dithiol-3-one dissolves during the addition, and the reaction product separates in the form of crystals. The thick, greenish magma is stirred for one hour at room temperautre. Then the crystals are filtered off, washed with 3000 parts of water, and recrystallized from methyl-Cellosolve. There are obtained 163 parts (61% of the theoretical amount) of 4-chloro-5-(N'-nitroso)-piperazino-1,2-dithiol-3-one in fine crystals of melting point 161°.

EXAMPLE 5

A mixture of 52 parts of 4-chloro-5-(N'-nitroso)-piperazino-1,2-dithio-3-one, 79 parts of aqueous 36% hydrochloric acid, 23.5 parts of urea, and 25 parts of methyl-Cellosolve is heated at 80-90° with stirring for 150 minutes. Strong fuming is observed at the beginning. The resulting yellow solution is set aside for 12 hours. Then the solvents are removed under reduced pressure, and the white residue is recrystallized from dimethylformamide.

There are obtained 40 parts (78% of the theoretical amount) of 4-chloro-5-piperazino-1,2-dithiol-3-one hydrochloride. The product melts at 235° with decomposition. The free base may be separated from the aqueous solution of its hydrochloride by the addition of sodium hydrogen carbonate. It crystallizes from ethanol in plates; M.P. 107°.

EXAMPLE 6

In the course of 1 hour, a cooled solution of 8 parts of cyanogen chloride in 50 parts of dichloromethane is run into a mixture of 27.3 parts of 4-chloro-5-piperazino-1,2-dithiol-3-one, 8.4 parts of sodium hydrogen carbonate, and 100 parts of dichloromethane with stirring. The stirring is continued for further 15 hours. Then the solvent is removed, and the residue is treated with water. The 4-chloro-5-(N'-cyano)-piperazino-1,2-dithiol-3-one remains insoluble. It is washed with a little ethanol, and recrystallized from methyl-Cellosolve. (The melting point is 156°.)

EXAMPLE 7

By repeating Example 2 but replacing the amine used therein by an equivalent amount of one of the amines given below, there are obtained the correspondingly 5-substituted 4-chloro-1,2-dithiol-3-ones:

2-hydroxyethyl-amine,
di-(2-hydroxyethyl)-amine,
3-methoxy-propylamine,
di-(2-methoxy-ethyl)-amine,
piperidine,
hexamethyleneimine,
morpholine,
N-methyl-piperazine,
N-acetyl-piperazine,
N-ethoxycarbonyl-piperazine,
N-benzyl-piperazine,
N-benzoyl-piperazine.

By using, in Example 2, 4,5-dibromo-1,2-dithiol-3-one, produced analogously to the 4,5-dichloro compound, from hexa-bromo-propene and sulfur, and pyrrolidine or one of the other amines used in Examples 1 and 3 to 7, there are obtained the correspondingly 5-substituted 4-bromo-1,2-dithiol-3-ones.

By using in Example 2, 4-methyl-5-chloro-1,2-dithiol-3-one, (prepared as described in German patent application 1,126,668), and pyrrolidine or one of the other amines used in Examples 1 and 3 to 7, there are obtained the correspondingly substituted 4-methyl-1,2-dithiol-3-ones.

EXAMPLE 8

A mixture of 27 parts of N-isopropylaniline, 19 parts of 4,5-dichloro-1,2-dithiol-3-one and 12 parts of methanol is heated at 70-80° for about 100 hours. Then, 50 more parts of methanol are added, and the mixture is allowed to cool. On scratching with a glass rod, the product crystallizes. It is filtered off and recrystallized from ethanol. There are obtained 19 parts of 4-chloro-5-N-isopropylanilino-1,2-dithiol-3-one; M.P. 112.5-113°.

EXAMPLE 9

To a mixture of 16.5 parts of anthranilic acid ethyl esters, 18.7 parts of 4,5-dichloro-1,2-dithiol-3-one and 100 parts of ethanol, 10.1 parts of triethylamine are added dropwise with stirring during 15 minutes, the internal temperature of the mixture being kept at 20-25° by cooling. Stirring is continued for 5 hours without cooling. During this time the product separates in crystals. It is filtered, and washed with ethanol and then with water. After drying, 13.7 parts of 4-chloro-5-(2'-ethoxycarbonyl-anilino)-1,2-dithiol-3-one, M.P. 142-148°, are obtained. Recrystallization from dioxane yields 10.7 parts of pure product, M.P. 148.5-151.5°.

If in the above example, 10.7 parts of 2,6-lutidine (2,6-dimethyl-pyridine) are used in lieu of the triethylamine, the yield of pure product is 11.5 parts.

EXAMPLE 10

95 parts of 4-chloro-5-(2'-ethoxycarbonyl-anilino)-1,2-dithiol-3-one are dissolved in a solution of 8 parts of sodium in 250 parts of ethanol. To the resulting solution, 40 parts of dimethylsulfate are added in one portion, and the mixture is set aside for 10 hours at room temperature. On scratching, the product crystallizes. It is filtered off, washed subequently with ethanol and water and recrystallized from ethanol. The yield of 4-chloro-5-(N-methyl-2'-ethoxy-carbonyl-anilino)-1,2-dithiol-3-one is 65 parts. The product melts at 101-103°.

EXAMPLE 11

A mixture of 27.6 parts of m-nitroaniline, 38.8 parts of tris-(2-hydroxy-1-propyl)-amine, 37.4 parts of 4,5-dichloro-1,2-dithiol-3-one and 50 parts of ethylene glycol monomethyl ether is stirred at room temperature for 12 hours. The crystalline material is then filtered off, washed with ethylene glycol monomethyl ether and recrystallized from the same solvent. 14 parts of 4-chloro-5-(3'-nitroanilino)-1,2-dithiol-3-one, M.P. 240-242°, are thus obtained.

EXAMPLE 12

To a suspension of 187 parts of 4,5-dichloro-1,2-dithiol-3-one in 500 parts of methanol, are added 186 parts of aniline with stirring and cooling during one hour. Stirring is continued for one further hour without cooling. The mixture is then refluxed for 12 hours. After cooling, the crystalline product is filtered off and recrystallized from ethylene glycol monomethyl ether (methylcellosolve). Thus, 220 parts of 4-chloro-5-anilino-1,2-dithiol-3-one, M.P. 163-4° are obtained.

EXAMPLE 13

73.2 parts of 4-chloro-5-anilino-1,2-dithiol-3-one are dissolved in 300 parts of dry pyridine, and 63 parts of benzoylchloride are added dropwise while stirring during 30 minutes, an internal temperature of 5–10° being maintained by cooling. Then the mixture is allowed to warm gradually, in the course of about 10 hours, to room temperature. Thereafter, the mixture is added to 1500 parts of ice water. An oily product separates which soon solidifies. It is thoroughly ground with 1000 parts of water and then with two portions of 150 parts each of methanol. The undissolved, crystalline material is twice recrystallized, first from a mixture of benzene and petrol and then from isopropanol. There are obtained 76.5 parts of 4-chloro-5-N-benzoyl-anilino-1,2-dithiol-3-one, M.P. 155–156°.

Further 4-chloro-1,2-dithiol-3-ones falling under Formula II are produced from the correspondingly substituted reactants in accordance with the procedure described in the example listed in the last column of the following table, these compounds bearing as substituents $R_1$ and $R_2$ or as heterocyclic substituents

those shown in the respective columns of the table.

| Ex. No. | $R_1$ | $R_2$ | Melting point (° C.) | Produced according to Example No. |
|---|---|---|---|---|
| 14 | H | 4'-cyano-phenyl | ¹252–254 | 9 |
| 15 | H | 2',6'-diethyl-phenyl | 155–156 | 12 |
| 16 | H | 2',6'-dimethyl-phenyl | 200–201 | 12 |
| 17 | H | 2',3'-dimethyl-phenyl | 181–181.5 | 12 |
| 18 | H | 3'-acetyl-phenyl | 191.5–193 | 9 |
| 19 | H | 3'-hydroxy-phenyl | 203 | 12 |
| 20 | Benzyl | Phenyl | 108–110 | 8 |
| 21 | Methyl | 2',6'-diethyl-phenyl | 68–68.5 | 10 |
| 22 | do | 2'-chloro-phenyl | 99.5–101 | 9 |
| 23 | do | 2',3'-dimethyl-phenyl | 103–104 | 10 |
| 24 | β-Hydroxy-ethyl | Phenyl | 98–99 | 8 |
| 25 | H | 4'-chloro-phenyl | 223 | 9 |
| 26 | H | 4'-dimethylamino-phenyl | 155 | 12 |
| 27 | Methyl | 3',4'-dichloro-phenyl | 226–227 | 10 |
| 28 | do | 2'-methyl-phenyl | 127 | 10 |
| 29 | Methyl | 2'-methoxy-phenyl | 122–123 | 10 |
| 30 | Ethyl | Phenyl | 117–118 | 8 |
| 31 | H | 3'-trifluoromethyl-phenyl | 156–158 | 9 |
| 32 | H | 2'-ethoxyphenyl | 102–103 | 12 |
| 33 | H | 2'-methoxycarbonyl-phenyl | 181–182 | 9 |
| 34 | Methyl | Naphthyl-(1') | 158–159 | 12 |
| 35 | do | Phenyl | 71–72 | 8 |
| 36 | do | 3'-chloro-phenyl | 97–98 | 10 |
| 37 | do | 3'-trifluoromethyl-phenyl | 99–100 | 10 |
| 38 | do | 2'-ethyl-phenyl | 104–105 | 10 |
| 39 | do | 2'-methyl-phenyl | 87–88 | 10 |
| 40 | do | 3'-nitrophenyl | 125–126 | 10 |
| 41 | β-Cyano-ethyl | Phenyl | | 8 |
| 42 | Methyl | 2'-carbamoyl-phenyl | 196 | 10 |
| 43 | do | 2'-phenyl-phenyl | | 10 |
| 44 | do | 2'-sulfamoyl-phenyl | | 10 |
| 45 | H | 3'-chloro-phenyl | 183–184 | 9 |
| 46 | H | 3',4'-dichloro-phenyl | 226–227 | 9 |
| 47 | H | 4'-ethyl-phenyl | 105–106 | 9 |
| 48 | H | 2'-hydroxy-phenyl | 161–162 | 9 |
| 49 | H | 2'-chloro-phenyl | 145–147 | 9 |
| 50 | H | 2'-ethyl-phenyl | 117–118 | 9 |
| 51 | H | 2'-phenyl-phenyl | 175.5–177 | 9 |
| 52 | H | 2'-carbamoyl-phenyl | 240 | 9 |
| 53 | H | 4'-methylthio-phenyl | 219.5–220 | 9 |
| 54 | H | 4'-diethylamino-phenyl | 145–145.5 | 12 |
| 55 | H | 3'-sulfamoyl-phenyl | 250–251 | 12 |
| 56 | H | 4'-methylsulfinyl-phenyl | 172.5–175 | 12 |
| 57 | Methyl | 2'-methoxycarbonyl-phenyl | 97–100 | 9 |
| 58 | H | Naphthyl-(2') | 230 | 9 |
| 59 | Methyl | 4'-ethyl-phenyl | 67–68 | 10 |
| 60 | $CH_3$ | 4'-diethylamino-phenyl | 124–125 | 9 |
| 61 | $CH_3$ | 3'-sulfamoyl-phenyl | 199 | 10 |
| 62 | $CH_3$ | 4'-methylthio-phenyl | 84.5–87 | 9 |
| 63 | H | 2'-(N,N-dimethyl-carbamoyl)-phenyl | | 9 |
| 64 | H | 3'-(N,N-dimethyl-sulfamoyl)-phenyl | | 9 |
| 65 | $CH_3$ | 2'-(N methyl sulfamoyl)-phenyl | | 12 |
| 66 | H | 2'-benzyl-phenyl | | 9 |
| 67 | H | 3'-sulfo-phenyl | | 12 |
| 8 | H | 4'-methylamino-phenyl | | 9 |
| 69 | H | 3'-amino-phenyl | | |

(By saponification of its acetyl compound obtained as in Example 12)

| Ex. No. | $R_1$ | R | Melting point (° C.) | Produced according to Example No. |
|---|---|---|---|---|
| 70 | | 3'-methyl piperidino | 80–81 | 2 |
| 71 | | 4'-methyl piperidino | 81–82 | 2 |

¹ Decomp.

Test I

The antifungal activity of the active substances of Formula I against spores of phytopathogenic fungi was determined by a germination test on spores of the following species: *Alternaria tenius, Botrytis cinerea, Clasteresperium q., Coniothyrium dipl., Fusarium culmorum, Mucor spec., Penicillium spec., Stemphylium cons.*

1 ccm. of a 1%, 0.1% and 0.01% acetone solution of the active ingredient is placed on each of two glass slides (26–76 mm.) under the same conditions. The solvent is evaporated off and a uniform coating of active ingredient is obtained on the glass slides. The slides are inoculated with spores of the above fungi and then kept in dishes at room temperature in an atmosphere which is almost saturated with steam. After 2–3 and 4–5 days, the germinated spores are counted.

The results are summarized in the following table.

+ Means an at least 90% inhibition of germination effected by the residue of 1 ccm. of a 1% acetone solution of active ingredient, ++ Means the same effect attained by the residue of 1 ccm. of a 0.1% acetone solution of the active ingredient, +++ Means an at least 90% inhibition of germination attained by the residue of 1 ccm. of a 0.01% acetone solution of active ingredient, − means no inhibition of germination with the concentrations of active ingredient given above.

TABLE I.—SPORE GERMINATION TEST

| Active substance | Alt. ten | Botr. cin | Clast. c. | Con dipl. | Fus. culm. | Muc. spec. | Penic. spec. | St. cons |
|---|---|---|---|---|---|---|---|---|
| 4-chloro-5-dimethylamino-1,2-dithiol-3-one | +++ | ++ | +++ | +++ | +++ | +++ | +++ | +++ |
| 4-chloro-5-diethylamino-1,2-dithiol-3-one | ++ | ++ | ++ | ++ | ++ | ++ | ++ | ++ |
| 4-chloro-5-β-hydroxyethylamino-1,2-dithiol-3-one | +++ | +++ | +++ | +++ | +++ | +++ | +++ | +++ |
| 4-chloro-5-pyrrolidino-1,2-dithiol-3-one | ++ | ++ | ++ | ++ | ++ | ++ | ++ | ++ |
| 4-chloro-5-piperidino-1,2-dithiol-3-one | ++ | ++ | ++ | ++ | ++ | ++ | ++ | ++ |
| 4-chloro-5-morpholino-1,2-dithiol-3-one | + | − | ++ | ++ | + | ++ | + | + |
| 4-chloro-5-hexamethyleneimino-1,2-dithiol-3-one | ++ | ++ | ++ | ++ | ++ | ++ | ++ | ++ |
| 4,5-dichloro-1,2-dithiol-3-one (German patent application No. 1,102,174) | − | − | − | − | − | − | − | − |

Test II

The activity against phytopathogenic fungi was further tested on:

(a) beans infested with *Uromyces appendiculatus*,
(b) cucumbers infested with powdery mildew (*Erysiphe cichoracearum*),
(c) tomatoes, against *Alternaria solanis*, causing spotty leaves.

(a) Leaves of bean plants (*Phascolus vulgaris*) in the two-leaf stage were sprayed with an aqueous suspension containing 0.1% of active substance.

The suspension is obtained from the 10% wettable powder described as form for application below, by diluting with water. After drying, the leaves are infested with a fresh suspension of spores of *Uromyces appendiculatus*. The plants are then left for one day in a moist room and then kept in a greenhouse. After about 7 to 10 days the test is evaluated.

(b) Cucumber (*Cucumis sativus*) leaves are treated analogously to the description given under (a), then sprayed with a fresh suspension of spores of powdery mildew (*Erysiphe cichoracearum*), then kept for one day in a moist room and then placed in a greenhouse. The test results were evaluated after 7 days.

(c) Leaves of 3 to 4-week-old tomato plants (*Solanum lycopersicum*) were sprayed with an aqueous suspension containing 0.1% of active substance. The suspension was prepared from a 10% spraying powder as described in Example IV(d), infra, by dispersion in water.

After drying the leaves were infested with a fresh suspension of spores of *Altenaria solani*. The plants were then left for 5 to 6 days in a moist room and then kept in a greenhouse at 20° C. in air having a relative moisture content of 95–100%. After about 7 to 10 days the test results were evaluated.

The known substances 4,5-dichloro-1,2-dithiol-3-one, 4-phenyl-5-chloro-1,2-dithiol-3-one and 4-(p-tolyl)-5-chloro-1,2-dithiol-3-one (German published patent application No. 1,126,668) were compared with the active substances according to the invention given in the column entitled "compounds" of the following tables.

The tests were evaluated according to the following scale:

10=full activity (no infestation)
9–1=decreasing activity
0=inactive
x=leaves damaged (burned place or zone)
xx=up to ⅓ of the leaf surface damage
xxx=more than ⅓ of the leaf surface damaged or leaf and plant respectively destroyed.

TABLE II-A

| Compound | Erysiphe cichorac. | Uromyces appendic. |
|---|---|---|
| 4-chloro-5-dimethylamino-1,2-dithiol-3-one | 10 | 10 |
| 4-chloro-5-pyrrolidino-1,2-dithiol-3-one | 9 | 8 |
| 4-chloro-5-piperidino-1,2-dithiol-3-one | 8 | 8 |
| 4-chloro-5-hexamethyleneimino-1,2-dithiol-3-one | 10 | 9 |
| 4-chloro-5-morpholino-1,2-dithiol-3-one | 9 | 9 |
| 4-chloro-5-(N'-methyl)-piperazino-1,2-dithiol-3-one | 0 | 10 |
| 4-chloro-5-(N'ethoxycarbonyl)-piperazino-1,2-dithiol-3-one | 5 | 7 |
| 4-phenyl-5-chloro-1,2-dithiol-3-one (known compound) | x | xx |
| 4-p-tolyl-5-chloro-1,2-dithiol-3-one (known compound) | x | xxx |
| 4,5-dichloro-1,2-dithiol-3-one (known compound) | 0 | 0 |

TABLE II-B

| Compound | Erysiph. cichorac |
|---|---|
| 4-chloro-5-(N-methyl-anilino)-1,2-dithiol-3-one | 10 |
| 4-chloro-5-(N-methyl-3'-chloro-anilino)-1,2-dithiol-3-one | 10 |
| 4-chloro-5-(N-methyl-3'-trifluoromethyl-anilino)-1,2-dithiol-3-one | 10 |
| 4-chloro-5-(N-methyl-2'-ethyl-anilino)-1,2-dithiol-3-one | 7 |
| 4-chloro-5-(N-methyl-2'-methyl-anilino)-1,2-dithiol-3-one | 10 |
| 4-chloro-5-(N-ethyl-anilino)-1,2-dithiol-3-one | 10 |
| 4,5-dichloro-1,2-dithiol-3-one (Disclosed in German patent application 1,102,174) | 0 |

TABLE II-C

| Compound | Alternaria tenuis |
|---|---|
| 4-chloro-5-anilino-1,2-dithiol-3-one | 10 |
| 4-chloro-5-(4'-chloro-anilino)-1,2-dithiol-3-one | 8 |
| 4-chloro-5-(4'-dimethylamino-anilino)-1,2-dithiol-3-one | 10 |
| 4-chloro-5-(N-methyl-3',4'-sichloro-anilino)-1,2-dithiol-3-one | 8 |
| 4-chloro-5-(N-methyl-2'-methyl-anilino)-1,2-dithiol-3-one | 9 |
| 4-chloro-5-(N-methyl-2'-methoxy-anilino)-1,2-dithiol-3-one | 9 |
| 4-chloro-5-(N-ethyl-anilino)-1,2-dithiol-3-one | 8 |
| 4-chloro-5-(3'-trifluoromethyl-anilino)-1,2-dithiol-3-one | 10 |
| 4-chloro-5-(N-benzylanilino)-1,2-dithiol-3-one | 6 |
| 4-chloro-5-(2'-ithoxy-anilino)-1,2-dithiol-3-one | 10 |
| 4-chloro-5-(2'-methoxycarbonyl-anilino)-1,2-dithio.-3-one | 7 |
| 4-chloro-5-(N-methyl-2'-ethoxycarbonyl-anilino)-1,2-dithiol-3-one | 7 |
| 4-chloro-5-(N-methyl-naphthyl-[1']-amino)-1,2-dithiol-3-one | 9 |
| 4-chloro-5-(N-benzoyl-anilino)-1,2-dithiol-3-one | 8 |
| 4,5-dichloro-1,2-dithiol-3-one (disclosed in German patent application 1,102,174) | 0 |

Test III 3 parts of an active ingredient as listed in Table III below are dissolved in 5 parts of a mixture (1:1) of dimethyl formamide and ethylene glycol monomethyl ether. 87 parts of a commercial paint dispersion on polyvinyl acetate-ethyl acrylate copolymer base are stirred in, 5 parts of water are added and the whole is stirred until a homogeneity is attained. Two other solutions are prepared in exactly the same way except that one contains 1 part of active ingredient and 89 parts of the commercial paint dispersion and the other contains 0.3 part of active ingredient and 89.7 parts of dispersion color. In this way, three ready-for-use paints are obtained which contain 3, 1 and 0.3% by weight of active ingredient, respectively.

The fungistatic and bacteriostatic activity of these paints is tested by painting therewith pieces of Whatman 3 MM filter paper, and the papers are exposed to the air, first for 3 days at room temperature (20° C.) and then for 8 days at 65° C.

Circular samples of 2 cm. diameter are cut from these filter papers and each sample is laid with its painted side upwards on cultures consisting each of 20 cm.$^3$ of Sabouraud-Maltose agar inoculated, respectively, with spores of *Pullularia pullulans, Paecylomydes varioti, Ponicillium cyclopium* and *Candida albicans*. The cultures are then stored in Petri dishes for 7 days at 28° C. Effective, broad and prolonged protection against mould formation is achieved on surface painted with the resulting composition.

The following table shows the concentrations of active ingredient with which mould has formed neither on the upper nor on the lower surface of the papers.

TABLE III

| | Effective concentration, percent sp. | | | |
|---|---|---|---|---|
| Compound | Pullularia pullulans | Raecylomydes varioti | Penicillium cyclopium | Candida albicans |
| 4-chloro-5-dimethyl-amino-1,2-dithiol-3-one | ≦0.3 | 3 | 1 | 1 |
| 4-chloro-5-pyrrolidino-1,2-dithiol-3-one | ≦0.3 | 1 | 1 | 3 |
| 4-chloro-5-piperidino-1,2-dithiol-3-one | ≦0.3 | 3 | 1 | 3 |
| 4-chloro-5-hexamethylene-imino-1,2-dithiol-3-one | ≦0.3 | 1 | 1 | 1 |
| 4-chloro-5-morpholino-1,2-dithiol-3-one | ≦0.3 | 1 | 1 | ≦0.3 |
| 4-phenyl-5-chloro-1,2-dithiol-3-one (German Patent 1'126'668) | >3 | >3 | >3 | >3 |
| 4,5-dichloro-1,2-dithiol-3-one (German Patent 1'102'174) | >3 | >3 | >3 | >3 |

Tests IV (a) to (c)

25 g. of the active substance to be tested are dissolved in 1 liter of ethylene glycol monomethyl ether. Strips of cotton fabric (weight of 1 square meter=about 85 (g.) which has been washed at the boil are dipped in this solution and then mangled to 40% by weight liquor content. The concentration of active substance on the fabric is thus 1% by weight. The strips of fabric are hung for 5 minutes in circulating steam and dried. The strips of fabric are then washed twice at 40° for 15 minutes each time with 5 g. of soap per liter of water, rinsed twice with cold water for 3 minutes each time and dried. The effectiveness of this treatment was determined by the following tests:

(a) Inhibition test

Circular samples of 2 cm. diameter are cut from the strips of said fabric and placed in petri dishes on agar which has been inoculated in the usual way with (A) *Staphylococcus aureus* SG 511
(B) *Candida albicans*
(C) *Aspergillus niger* EMPA 1.

The inoculated dishes containing strains A and B are stored for 24 hours at 37°, and strain C for 3 days at 28°.

(b) Maceration test

Circular samples of 4 cm. diameter are cut from the fabric treated as described above, and subjected to maceration in compost consisting of 50% of cow dung, 30% of compost and 20% of sand. The earth has 30% humidity and is kept at 28° C. After 10 days, the samples are disinterred, cleaned and conditioned. The tensile strength after maceration, measured by the resistance to perforation is compared with that of the fabric before the treatment above described, the initial tensile strength having been previously determined. It is expressed in percentage of said initial tensile strength.

(c) Moldy spot test

Circular samples of 8 cm. diameter are cut from the fabric treated as described above and placed on sterile Worth agar plates produced in the following way: Amounts of 15 ml. each of Worth agar (Difco Manual, 9th edition, p. 244) are spread in petri dishes of 10 cm. diameter and left to solidify.

The samples are placed on the agar which is then inoculated with a spore suspension containing a mixture of the spores of the fungi *Chaetomium globosum*, *Aspergillus niger* and *Trichoderma viride*.

The petri dishes are stored for 5 days at 28° C. and the growth of mould is then determined.

TEST RESULTS (a) Inhibition test

+ = Bacterial and/or fungus growth on the upper and lower side of the test sample
— = Sample remains free from growth
(A) *Staphylococcus aureus* SG 511
(B) *Candida albicans*
(C) *Aspergillus niger*

| Compound | A | B | C |
|---|---|---|---|
| 4-chloro-5-piperidino-1,2-dithiol-3-one | — | — | — |
| 4-chloro-5-pyrrolidino-1,2-dithiol-3-one | — | — | — |
| 4-phenyl-5-chloro-1,2-dithiol-3-one (German Patent 1,126,668) | + | + | + |
| 4-phenyl-5-chloro-1,2-dithiol-3-one (German Patent 4,5-dichloro-1,2-dithiol-3-one (German Patent 1,102,174) | + | + | + |

(b) Maceration test

Final resistance to perforation (in percent)

(c) Moldy spot test

+ = Moldy spots and growth of mold
— = Free from moldy spots and mold growth

| Compound | Maceration test | Moldy spot test |
|---|---|---|
| 4-chloro-5-piperidino-1,2-dithiol-3-one | 100 | — |
| 4-phenyl-5-chloro-1,2-dithiol-3-one (German Patent 1,126,668) | 0 | + |
| 4,5-dichloro-1,2-dithiol-3-one (German Patent 1,102,174) | 0 | + |

For the purpose of protecting organic materials and plants which may suffer from attack, the active substances can also be applied in combination with other substances suitable for the protection of materials or plants. The antifungally active agents according to the invention are produced in the known ways by intimately mixing and milling the active substances of General Formula I with suitable carriers, optionally with the addition of dispersing agents or solvents which are inert to the active substances. These agents can be in the following forms for application:

Solid forms: dusts, sprinkling agents, granulates such as coated granules, impregnated granules, homogeneous granules.

Water dispersible concentrates of active substances: Wettable powders, pasters, emulsions.

Liquid forms: solutions.

To produce the solid forms for use (dusts, sprinkling agents, granulates), the active substances are mixed with solid carriers. Examples of carriers are kalon, talcum, bole, loess, chalk, limestone, ground limestone, ataclay, dolomite, diatomaceous earth, precipitated silicic acid, alkaline earth silicates, sodium and potassium aluminium silicates (feldspar and mica), calcium and magnesium sulphates, magnesium oxide, milled synthetic plastics, fertilizers such as ammonium sulphate, ammonium phosphate, ammonium nitrate, urea, ground vegetable products such as bran, bark dust, sawdust, ground ntushells, cellulose powder, residues of plant extractions, active charcoal etc. These carriers can be used alone or admixed with each other.

The particle size of the carriers is, for dusts up to about 100μ, for sprinkling agents from about 75μ–0.2 mm. and for granulates from 0.2 mm.–1 mm. or coarser.

As a general rule, the concentrations of active substances in the solid preparations is from 0.5–80%.

To these mixtures can also be added additives which stabilise the active substance and/or non-ionegenic, anionically and cationically active substances which, for example, improve the adhesion of the active substances on plants and parts of plants (glues and adhesives) and/or attain better wettability (wetting agents) and dispersibility (dispersing agents) of the active substances. Examples of adhesives are as follows: olein/chalk mixtures, cellulose derivatives (methyl celluloses, carboxymethyl celluloses), hydroxyethyl glycol ethers of mono- and dialkyl phenols having 5–15 ethylene oxide radicals per molecule and 8–9 carbon atoms in the alkyl radical [for example, the products sold under the commercial names "Triton" (Rohm and Haas, Philadelphia), "Tergitol" (Union Carbide Chemical Co., New York, N.Y.) and "Igepal" (General Aniline & Film Corp., Antara Chemicals Div. New York)], lignin sulphonic acids, their alkaline and alkaline earth salts, polyethylene glycol ethers (Carbowaxes), fatty alcohol polyethylene glycol ethers having 5 to 20 ethylene oxide radicals per molecule and 8–18 carbons atoms in fatty alcohol moiety [e.g., the products sold under the commercial names "Genapol" (Farbwerke Hoechst A.G. Frankfurt a. M.)], condensation products of ethylene oxide/propylene oxide [e.g. the products sold under the commercial names "Pluronics" (produced by Wyandotte Chemicals Corp., Industrial Chemical Div., Wyandotte, Mich.)], polyvinyl pyrrolidones, polyvinyl alcohols [e.g. the product sold under the commercial name "Moviel" (Farbwerke Hoechst A.G., Frankfurt a.M.), condensation products of urea-formaldehyde and also Latex products.

The concentrates of active substance which can be dispersed in water (wettable powders), pastes and emulsion concentrates, are agents which can be diluted with water to any concentration desired. They consist of active substance, carrier, optionally additives which stabilise the active substance, surface active substances, and anti-foam agents and, optionally, solvents. The concentration of active substance in these agents is 5–80%.

Wettable powders and pastes are obtained by mixing and milling the active substances with dispersing agents and pulverulent carriers in suitable mixers and milling machines until homogeneity is attained. Carriers are, for example, those mentioned in the paragraph dealing with solid forms for application. In some cases it is advantageous to use mixtures of different carriers. As dispersing agents can be used, for example: condensation products of sulphonated naphthalene and sulphonated naphthalene derivatives with formaldehyde [e.g. the product sold under the commercial name "Sellasol" (producer J. R. Geigy A.G. Basle)], condensation products of naphthalene or of naphthalene sulphonic acids with phenol and formaldehyde [e.g. the products sold under the commercial name "Irgatan" (producer J. R. Geigy A.G. Basle)], also alkali, ammonium and alkaline earth salts of lignin sulphonic acid, also alkylaryl sulphonates, alkali and alkaline earth salts of dibutyl naphthalene sulphonic acid, fatty alcohol sulphates such as salts of sulphated hexadecanols, heptadecanols, octadecanols, octadecenols and salts of sulphated fatty alcohol polyglycol ethers [e.g., the products sold under the commercial name "Entopon" (producer J. R. Geigy A.G. Basle)], the sodium salt of oleoyl ethionate, the sodium salt of oleoyl methyl tauride [the products sold under the commercial name "Arkopon" (producer Farbwerke Hoechst, Frankfurt am Main)], ditertiary acetylene glycols [e.g. the products sold under the commercial name "Surfynol" (producer Air Reduction Chemical Company, New York, N.Y.)], dialkyldilauryl ammonium chloride [the product sold under the commercial name "Aliquat" (producer General Mills Inc., Kankakee, Illinois)] and fatty acid alkali and alkaline earth salts.

Silicones, "Antifoam A," etc., are used, for example, as anti-foaming agents.

The active substances are so mixed, milled, sieved and strained with the additives mentioned above that the solid particle size in wettable powders is 24–40μ and in pastes is not more than 3μ. To produce emulsion concentrates and pastes, dispersing agents such as those given in the previous paragraphs, organic solvents and water are used. Examples of solvents are as follows: alcohols, benzene, xylenes, toluene, dimethyl sulphoxide and mineral oil fractions boiling between 120 and 350°. The solvents must be almost without smell, not phytotoxic, inert to the active substances and not easily inflammable.

In addition, the agents according to the invention can be applied in the form of solutions. For this purpose the active substance or several active substances of general Formula I are dissolved in suitable organic solvents, mixtures of solvents or in water. Aliphatic and aromatic hydrocarbons, chlorinated derivatives thereof, alkyl naphthalenes, alone or mixed with each other can be used as organic solvents. The solutions contain the active substances in a concentration from 1–20%.

The agents according to the invention described can be mixed with other biocidally active compounds or agents. Thus, to broaden the range of action, the new agents can contain e.g., insecticides, other fungistatics, bactericides, fungicides, bacteriostatics or nematocides in addition to the compounds mentioned of general Formula I. The agents according to the invention can also contain fertilisers, trace elements etc.

The following forms for application of such agents serve to illustrate the present invention further; where not otherwise expressly stated, parts and percentages are given by weight.

EXAMPLE I.—Dusts

To produce (a) a 10% and (b) a 2% dust, the components given below are used:

(a)

10 parts of 4-chloro-5-dimethylamino-1,2-dithiol-3-one,
5 parts of highly dispersed silica
85 parts of talcum.

(b)

2 parts of 4 - chloro - 5-hexamethyleneimino-1,2-dithiol-3-one,
1 part of highly dispersed silica
97 parts of talcum.

The above carriers are intimately mixed and milled with the active substances. The fungicidal dusts so obtained serve for the treatment of seed beds or for dusting plants.

Similarly active dusts are obtained by using in the above compositions in lieu of the active substances mentioned therein, identical amounts of (c) 4-chloro-5-(N-methyl-anilino)-1,2-dithiol-3-one or
(d) 4-chloro-5-(3'-nitro-anilino)-1,2-dithiol-3-one.

EXAMPLE II.—Seed Dressing (a)

10 parts of 4-chloro-5-diethylamino-1,2-dithiol-3-one
5 parts of kieselguhr,
1 part of liquid paraffin,
84 parts of talcum.

(b)

60 parts of 4-chloro-5-(N'-β-hydroxyethyl)-piperazino-1,2-dithiol-3-one,
15 parts of kieselguhr,
1 part of liquid paraffin,
24 parts of talcum.

are used to produce (a) a 10% and (b) a 60% seed dressing.

The active substances mentioned are intimately mixed and then milled with the carriers given and the paraffin as distributing agent. The pulverulent dressings obtained serve for the treatment of seeds of all types.

Seed dressings are also obtained by using in the above compositions in lieu of the active substances mentioned above:

(c) 4 - chloro - 5 - (N-methyl-3'-trifluoromethyl-anilino)-1,2-dithiol-3-one, or
(d) 4-chloro-5-(N-ethyl-anilino)-1,2-dithiol-3-one.

EXAMPLE III.—Granulates

To produce (a) a 2.5% and (b) a 5% granulate, the following components are used:

(a)

2.5 parts of 4-chloro-5-(N'-ethoxycarbonyl)-piperazino-1,2-dithiol-3-one,
2.5 parts of kieselguhr,
5 parts of polyethylene glycol,
89.3 parts of ground limestone (0.4–0.8 mm. diameter),
0.7 parts of silica.

(b)

5 parts of 4-chloro-5-β-hydroxyethylamino-1,2-dithiol-3-one,
1.5 parts of kieselguhr,
0.5 parts of cetyl polyglycol ether,
87 parts of ground limestone,
5 parts of polyethylene glycol,
1 part of silica.

The ground limestone in each formulation is impregnated with the polyethylene glycol or the cetyl polyglycol ether and then mixed with a mixture of the active substance mentioned, the kieselguhr and silicic acid. These granulates are particularly suitable for the disinfection of seed beds.

Granulates are also obtained by replacing the active components in the above compositions by identical amounts of (c) 4 - chloro-5-(N-methyl-2'-methyl-anilino)-1,2-dithiol-3-one, or
(d) 4-chloro-5-(N-isopropyl-anilino)-1,2-dithiol-3-one.

EXAMPLE IV.—Wettable powders

To produce (a) a 25%, (b) and (c) 50% and (d) a 10% wettable powder, the following components are used:

15

(a)

25 parts of 4-chloro-5-morpholino-1,2-dithiol-3-one,
25 parts of kieselguhr,
2 parts of hexadecyl glycol ether sulphate,
1 part of sodium lauryl sulphate,
7 parts of sodium lignin sulphate,
40 parts of kaolin.

(b)

50 parts of 4-chloro-5-pyrrolidino-1,2-dithiol-3-one, 3-one,
3 parts of oleyl methyl tauride sodium salt,
2 parts of sodium lauryl sulphate,
5 parts of sodium lignin sulphate,
2 parts of kaolin/polyvinyl alcohol mixture (1:1),
38 parts of silicic acid (precipitated).

(c)

50 parts of 4-chloro-5-pyrrolidine-1,2-dithiol-3-one,
15 parts of kieselguhr,
10 parts of sodium lignin sulphate,
5 parts of dibutyl naphthalene sulphonic acid sodium salt,
20 parts of kaolin, (d)

10 parts of 4-phenyl-5-morpholino-1,2-dithiol-3-one,
10 parts of sodium lignin sulphate,
2 parts of a finely milled mixture of kaolin and polyvinyl alcohol (1:1),
10 parts of kieselguhr,
38 parts of kaolin,
30 parts of Champagne chalk.

The active substances mentioned are mixed and finely milled with the carriers and distributing agents. Wettable powders are obtained which have excellent wettability and suspendability. From such wettable powders with water, suspensions are obtained of any concentration of active substance desired. They serve for the treatment of cultivated plants. They can also be used for the impregnation of organic materials of all types.

Wettable powders are also obtained by replacing the active component in the above compositions by identical amounts of (e) 4-chloro-5-(N-ethyl-anilino)-1,2-dithiol-3-one,
(f) 4-chloro-5-(N-methyl-3'-chloro-anilino)-1,2-dithiol-3-one,
(g) 4-chloro-5-(N-methyl-2'-ethyl-anilino)-1,2-dithiol-3-one, or
(h) 4-chloro-5-(N-methyl-anilino)-1,2-dithiol-3-one EXAMPLE V.—Emulsion concentrates To produce (a) a 5%, (b) a 10%, and (c) a 15% emulsion concentrate, the following components are used:

(a)

5 parts of 4-chloro-5-(N'-ethoxycarbonyl)-piperazino-1,2-dithiol-3-one
40 parts of dimethyl formamide
50 parts of petroleum (boiling range 230–270°)
5 parts of composite emulsifyer consisting of the Ca salt of dodecylbenzene sulphonic acid and a condensation product of ethylene oxide and ricinus oil (e.g. "Emullat WK," Union Chimique Belge, S.A., Brussels).

(b)

10 parts of 4-chloro-5-benzylamino-1,2-dithiol-3-one
35 parts of dimethyl formamide
50 parts of petroleum (boiling range 230–270°)
5 parts of composite emulsifyer consisting of the Ca salt of dodecylbenzene sulphonic acid and a condensation product of ethylene oxide and ricinus oil (e.g., "Emullat WK," Union Chimique, S.A., Brussels).

16

(c)

15 parts of 4-chloro-5-piperidino-1,2-diethiol-3-one
27 parts of dimethyl formamide
53 parts of petroleum (boiling range 230–270°)
5 parts of composite emulsifier consisting of the Ca salt of dodecylbenzene sulphonic acid and a condensation product of ethylene oxide and ricinus oil (e.g. "Emullat WK," Union Chimique, S.A., Brussels).

The active ingredient used is dissolved in petroleum or dimethyl formamide and the composite emulsifyer is added to this solution. Emulsion concentrates are obtained which can be diluted with water to any concentration desired. Such emulsions are suitable for the treatment of cultivated plants and also for the impregnation or organic materials such as textiles, wood, leahter, synthetic plastics etc.

Emulsion concentrates are also obtained by replacing the active components in the above concentrates by identical amounts of (d) 4-chloro-5-(N-ethyl-2'-methoxy-anilino)-1,2-dithiol-3-one,
(e) 4-chloro-5-(N-benzyl-anilino)-1,2-dithiol-3-one, or
(f) 4-chloro-5-(2'-methoxy-anilino)-1,2-dithiol-3-one.

We claim:
1. A fungal growth-inhibiting composition comprising at least about 0.01%, calculated on the total weight of the composition, of a compound of the formula

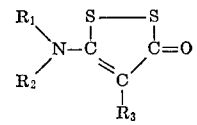

wherein
$R_1$ and $R_2$ taken together with the nitrogen atom to which they are linked, represents morpholino, and
$R_3$ represents chlorine, bromine or lower alkyl, and a carrier therefor.

2. A composition as defined in claim 1, wherein, $R_3$ represents bromine or chlorine.

3. A composition as defined in claim 2 wherein said compound is 4-chloro-5-morpholino-1,2-dithiol-3-one.

4. The method of inhibiting fungus growth, which comprises exposing fungi to a fungitoxic amount of a compound of the formula

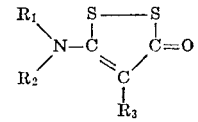

wherein
$R_1$ and $R_2$ taken together with the nitrogen atom to which they are linked, represent, morpholino, and
$R_3$ represents chlorine, bromine or lower alkyl.

References Cited

UNITED STATES PATENTS

| | | | |
|---|---|---|---|
| 3,031,372 | 4/1962 | Brack | 424—277 |
| 3,062,833 | 11/1962 | Boberg et al. | 260—327 |
| 3,109,772 | 11/1963 | Carosino | 424—277 |
| 3,527,867 | 9/1970 | Bader et al. | 424—277 |
| 3,546,235 | 12/1970 | Bader et al. | 260—294.8 |

FOREIGN PATENTS

| | | |
|---|---|---|
| 1,102,174 | 10/1961 | Germany. |
| 1,126,668 | 10/1962 | Germany. |
| 1,492,969 | 8/1967 | France. |
| 1,528,170 | 6/1968 | France. |

SHEP K. ROSE, Primary Examiner